INVENTOR
JOHN ALDOUS FRY

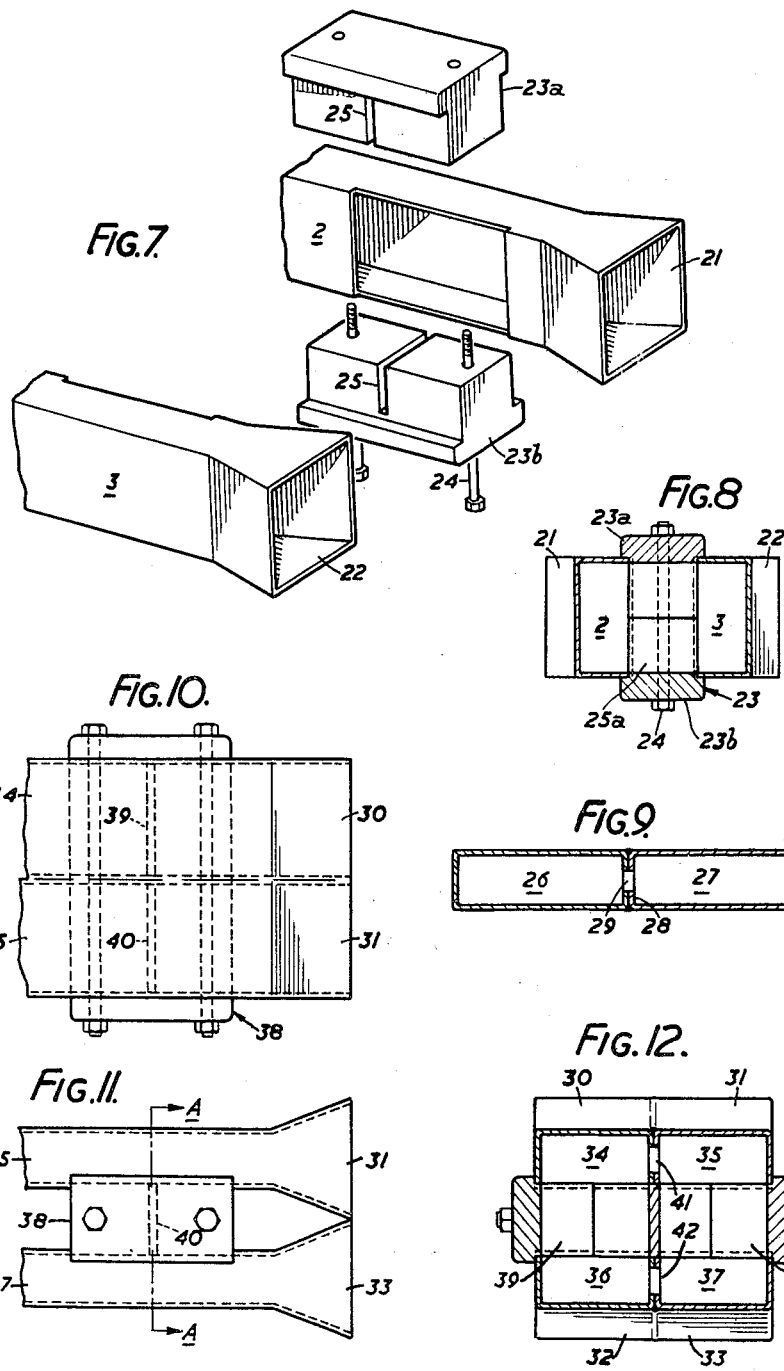

United States Patent Office 2,941,205
Patented June 14, 1960

2,941,205

DIRECTIONAL AERIAL SYSTEMS

John Aldous Fry, Luton, England, assignor to The English Electric Company, London, England, a British company Filed Dec. 10, 1954, Ser. No. 474,347

Claims priority, application Great Britain Dec. 18, 1953

7 Claims. (Cl. 343—778)

This invention relates to directional aerial systems of the kind in which a plurality of individual directional aerials are arranged in fixed relationship one with another so as to define one or more equi-signal planes, and in which, for economy of space or otherwise, the individual aerials are located close together, thus giving rise to mutual impedances of appreciable magnitude. For example, a typical aerial system for use in a micro-wave radar system has, in a common reflector, four individual aerials having each a polar response diagram which includes a single, narrow major lobe; the aerials are coupled in pairs with the major lobes of the aerials of each pair at a slight angle to each other, so that one pair of aerials defines an equi-signal plane in azimuth and the other pair defines an equi-signal plane in elevation. By this means the direction of a received signal can be uniquely determined.

In this specification the term "static split aerial systems" will be used to describe the systems defined and exemplified in the preceding paragraph, and will include the means by which the received energy is transmitted from the aerials to the associated receiving equipment. It is assumed that in such a system the distance between the aerial system and the receiving apparatus, in terms of the wavelength of the received energy, is sufficiently large to render necessary the use of some form of transmission line to connect together the various parts of the system.

It is a primary object of the present invention to reduce certain directional errors which may be present in a static split aerial system of this kind and which are a function of operating frequency within the specified working bandwidth of the receiving system.

According to the invention, a static split aerial system of the kind described, wherein mutual coupling exists between the various aerials of the system, includes means for establishing further mutual coupling between the said aerials of substantially equal magnitude but of opposite effect to the said existing mutual coupling.

The invention will now be discussed with reference to the accompanying drawings.

For convenience the discussion is limited to systems in which waveguides are used for the aerial transmission lines, implying an operating frequency of the order of 10,000 Mc./s., but the invention is equally applicable to systems working on lower frequencies and employing forms of transmission lines other than waveguides.

In the drawings:

Fig. 1 is a schematic diagram of a known form of micro-wave static split aerial system and part of its associated receiving equipment;

Figs. 2 to 5, inclusive, show graphically the relationship of various variable quantities within the system; and Fig. 6(a) shows a schematic diagram of an improved form of the system according to the present invention;

Figs. 7 and 8 show respectively an exploded view of one embodiment of the invention as applied to an aerial system having two individual aerials, and a transverse section through the assembled structure;

Fig. 9 shows a transverse section of a second embodiment of the invention; and

Figs. 10, 11 and 12 show respectively an elevation, a plan and a transverse section (on the line A—A of Fig. 11) of a four-element system to which the invention is applied.

In describing the invention, it is necessary first to discuss the operation of known static split aerial systems and their associated receiving equipment, and to advance an explanation for certain directional errors which are apparently inherent in such systems.

Figure 1:
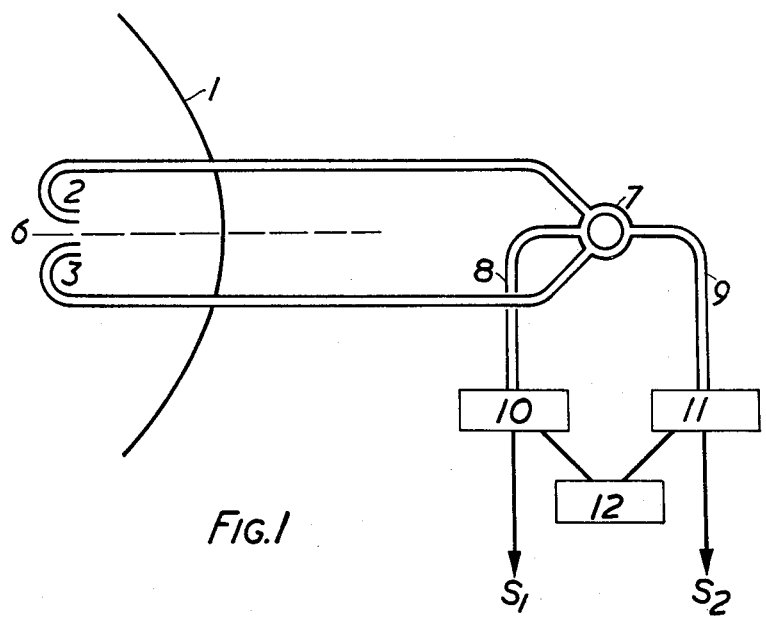
Figure 2:
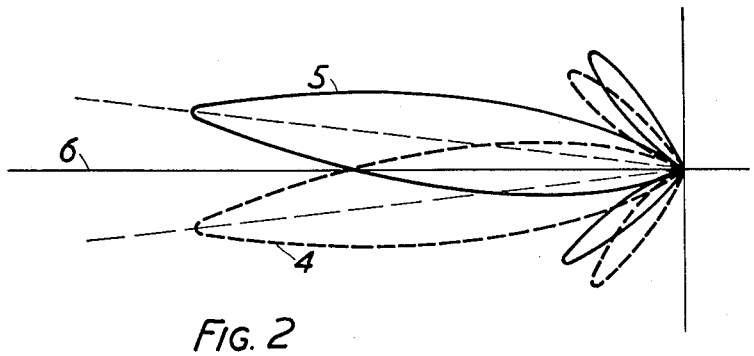

In the system shown in Fig. 1, the aerial system includes a single parabolic reflector 1 from which received energy is extracted in the conventional manner by open-ended waveguides 2 and 3. For a first analysis the system may be considered as comprising two entirely independent aerials, having the separate polar response diagrams shown at 4 and 5, respectively, in Fig. 2. The waveguides 2 and 3 are placed in the reflector so that the major lobes of these diagrams are inclined to each other at a slight angle, and thus define an equi-signal plane through the axis 6 of the reflector. (For clarity, only a single set of minor lobes is shown in Fig. 2; it will be seen, however, that responses from these lobes are negligible compared with responses from the major lobes.)

The waveguides 2 and 3 terminate in a ring hybrid system 7 from which further waveguides 8 and 9 extract outputs of amplitudes which are respectively the sum and difference of the amplitudes of the signals carried by the waveguides 2 and 3. These outputs are fed to crystal mixing stages 10 and 11 which, in cooperation with a local oscillator 12, produce corresponding outputs $S_1$ and $S_2$ at a suitable intermediate frequency.

Figure 3:
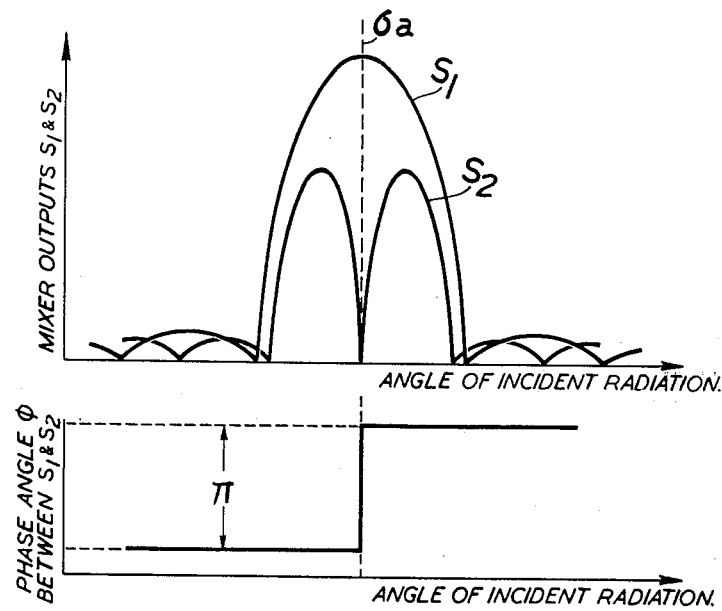

The polar diagrams (for convenience in Cartesian coordinates) and phase relationship of the sum and difference outputs of the mixers are shown in Fig. 3. The dotted ordinate 6a in this figure represents the angular position of the reflector axis 6.

Figure 4:
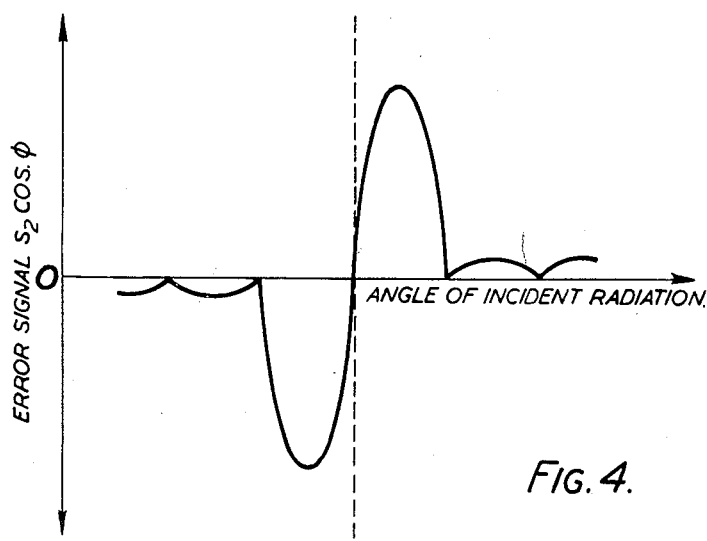

The output $S_2$ from the "difference" mixer 11 is zero when the incident radiation arrives at the aerial in the equi-signal plane—that is, in a micro-wave system such as this, when the plane of the axis of the reflector includes the source of radiation. Small departures of the source from this plane will result in an output from the mixer 11 corresponding in amplitude and phase to the magnitude and sense of the movement of the source. If the amplitude and phase of this output can be correlated, the resultant signal will provide, within limits, a unique indication of the movement of the source in relation to the equi-signal plane. A convenient reference signal for determining the phase of the "difference" signal $S_2$ is the output $S_1$ of the "sun" mixer 10, which is unchanged in phase by positive or negative departures from the equisignal condition. Fig. 4 shows the error signal obtained by multiplying the difference output $S_2$ by the cosine of the phase angle $\phi$ between the sum and difference outputs.

It will be understood that since the aerial system described only defines an equi-signal plane through the axis of the reflector, in order to determine a unique equi-signal direction a second pair of aerials must be arranged to define a further plane intersecting the plane defined by the first pair. The considerations of the present discussion apply to each pair of such a system.

Figure 5:
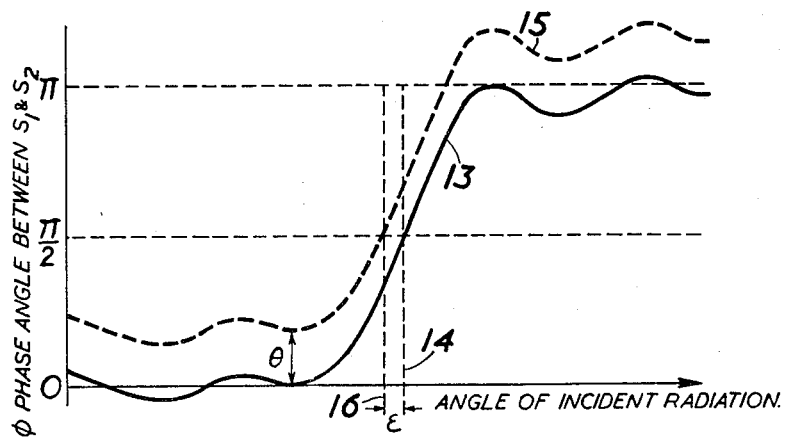

In a practical aerial system the "difference" signal $S_2$ is generally not zero in the equi-signal condition. Instead it passes through a minimum, more or less sharply defined according to the characteristics of the system. The phase relationship between the "sum" and "difference" signals also departs from the ideal characteristic shown in Fig. 3, but retains the property that the phase angle $\phi$ between the signals is equal to 90° in the equi-signal condition. Thus an error signal $S_2 \cos \phi$ will still be zero in the equi-signal condition, even though the "difference" signal $S_2$ is not zero. A typical phase characteristic of this kind is shown at 13 in Fig. 5, the line 14 representing direction of the corresponding equi-signal plane.

It has been found in practice that systems of this kind are subject to directional errors of appreciable magnitude, which are a function of frequency even within the specified working bandwidth of the receiving system. These errors may be accounted for if, in addition to the predicted phase displacement $\phi$ between the signals $S_1$ and $S_2$, it is assumed that the system introduces at some point a further phase displacement $\theta$ between these signals, the effect of which will be to displace the curve 13 in Fig. 5 upwards or downwards, say to 15 in Fig. 5. The apparent equi-signal direction, if still determined by the condition $\phi = 90°$, will be displaced to 16 (Fig. 5), introducing an angular error $\epsilon$ depending on the sign and magnitude of the phase error $\phi$.

It is found that phase errors of appreciable magnitude are inherent in the simple system shown in Fig. 1. These errors arise from the inevitable mutual coupling that will exist in any system of practicable dimensions between the ends of the waveguides 2 and 3; this coupling makes it impossible to match correctly both the "sum" and "difference" inputs to the mixers 10 and 11, since the coupling is of one sign when the waveguides are excited in phase and of the other sign when they are excited out of phase.

Each of the crystal mixers 10 and 11 normally includes a tuned output circuit for extracting the intermediate frequency output. This circuit is in effect loaded by the crystal output impedance, which is itself partly dependent on the matching conditions at the input of the mixer. Thus the introduction of a mismatch in the aerial system, or variations in existing mismatches there, will result in variations in the loading of the mixer output circuits and consequently in variations of the phase shifts occurring therein. In general these variations in phase shifts will not be equal for each signal path; as a result of the phase error thus introduced between the two signals the system will no longer indicate the true direction of the equi-signal plane. Further, the phase of the mismatch as measured at the waveguide input to the mixer will vary with the frequency of the received signal, owing to the change in electrical length of a transmission line of fixed physical length with changes in frequency, so that a fixed correction designed to compensate for the phase error will only be effective at a single frequency.

Figure 6A:
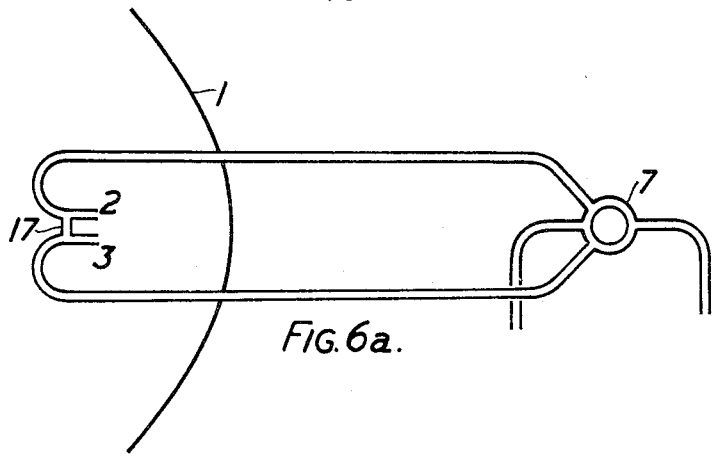
Fig. 6(b) shows an equivalent schematic diagram of part of the system shown in Fig. 6(a).

Fig. 6A shows an improved form of the system in which by the application of the present invention this defect is at least partly overcome. This system differs from that shown in Fig. 1 by the addition of a further branch waveguide 17 between the ends of the waveguides 2 and 3.

Figure 6B:
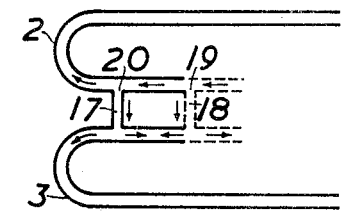

The arrangement will be best understood by a consideration of Fig. 6B, which shows an equivalent arrangement in which the mutual coupling between the ends of the waveguides 2 and 3 in Fig. 1 is represented by a further waveguide 18, arranged to afford the same degree of coupling between the waveguides as is afforded in practice by their proximity in the reflector 1.

Consider a wave of constant frequency and amplitude being propagated along the waveguide 2, in Fig. 6B, from right to left. At the junction 19 the energy of the wave will be divided in a ratio depending on the relative dimensions of the two waveguides, a fraction $n$ passing down the waveguide 18 and a fraction $(1-n)$ moving on along the waveguide 2. At the junction 20 a further division takes place, a fraction $m(1-n)$, say, passing down the waveguide 17 and a fraction $$(1-m)(1-n)$$

being passed on to the ring hybrid system 7.

The resultant energy fed into the lower waveguide 3 through the branch waveguides 17 and 18 will depend on the relative amplitudes and phase of the components due to each branch waveguide. If the field strengths of the components are equal, and they are out of phase with each other by 180°, they will cancel completely, so that the effect of the connection between the waveguides 2 and 3 is nullified. The necessary conditions for zero transfer of energy are (a) that $$m = \frac{n}{1-n}$$

using the notation of the previous paragraph, and (b) that the two components in the waveguide 3 are 180° out of phase.

The critical dimensions and location of the branch waveguide 17 to satisfy these conditions can be calculated from the geometry of the aerial system, or can be determined experimentally. A number of possible positions for the branch waveguide 17 exist, separated by distances equal to integral numbers of half-wavelengths of the mean operating frequency. It is desirable, however, for the branch waveguide 17 to be as close as possible to the open ends of the waveguides 2 and 3, since this enables the coupling between the waveguides 2 and 3 to be nullified over the widest possible frequency band. It is then possible to maintain the mixer input matching conditions substantially constant over this frequency band, and hence to reduce the possibility of directional errors.

The system introduces an attenuation factor of approximately $(1-(m+n))$ into each aerial feeder. In practice $m$ and $n$ will generally be small enough for this effect to be neglected.

The actual construction of the branch waveguide 17 may take any one of several forms. Figs. 7 and 8 illustrate one preferred construction. In these figures the waveguides 2 and 3 are rectangular in cross-section and terminate in short flared horns 21 and 22, which make contact with each other at their outer ends. These horns constitute the individual aerials of the system and by virtue of their contact or very close proximity there is appreciable mutual coupling between them.

Immediately behind the horns 21 and 22 the opposed longer sides of the waveguides 2 and 3 are cut away. A coupling member 23 is secured between the two waveguides so that its machined faces continue without a break the internal surfaces of the cut-away walls. Fig. 8, which is a transverse section through the centre of the coupling member 23, shows this construction. The coupling member 23 is made in two parts, 23a and 23b, secured together by through-bolts 24; saw-cuts 25 in each part form a slot 25a, which acts as the branch waveguide between the main waveguides 2 and 3. This slot runs the full width of the waveguide; its own width determines the degree of coupling it affords between the waveguides and its position, in relation to the horns 21 and 22, the phase of the transferred energy. By varying these two factors and determining the energy transfer between the two waveguides for their different values, the necessary conditions for zero total energy transfer between the two aerials can be found experimentally.

Fig. 9 illustrates an alternative construction which is simpler to put into practice once its dimensions are determined but less readily adjusted for experimental purposes. Two waveguides 26 and 27 are placed with two narrow walls in contact, the two walls being soldered together to form a single common wall 28. An aperture 29, or a series of apertures, in this common wall constitutes the branch waveguide 17, its characteristics being determined in much the same way as those of the slot 25a in Figs. 7 and 8.

These two constructions are both employed in the aerial system shown in Figs. 10, 11 and 12, which is a four-element array capable of defining a unique equi-signal direction by the intersection of two equi-signal planes, as explained earlier in this specification. In this system four horns 30–33 feed waveguides 34–37. Each waveguide is coupled, by the two forms of coupling already described, to the two adjacent waveguides, the coupling being determined so that the total coupling between any two aerials of the system is substantially zero.

In this case the coupling member 38 is made in three parts and has two slots 39 and 40 in it, the slot 39 coupling the two waveguides 34 and 36 and the slot 40 coupling the waveguides 35 and 37. The waveguides 34 and 35 (and similarly the waveguides 36 and 37) are coupled together by the type of coupling shown in Fig. 9, the coupling apertures being shown at 41 and 42.

The invention has been described with reference to an aerial system the chief purpose of which is the definition of an equi-signal direction and the indication whether or not a received signal has arrived at the aerial from that direction. The invention also has important applications to cases where in addition the system is used to determine the magnitude of small departures of the source of radiation from the equi-signal direction, or, in the simple two-aerial system of Figs. 1–6, the equi-signal plane.

This application of the invention will be further described with reference to Fig. 4, in which a curve is shown relating the angle of the incident radiation to the error signal $S_2 \cos \phi$. If the strength of the incident radiation were at all times constant the curve of Fig. 4 would be sufficient to determine, over the region between the major positive and negative peaks of the curve, a unique angle of the incident radiation corresponding to a given amplitude and sign of the error signal.

In general the amplitude of the incident radiation will not be constant so that the single curve of Fig. 4 will be replaced by a family of curves, one for each possible value of the strength of the incident radiation.

Supposing that the desired curve of Fig. 4, and also the curves $S_1$ and $S_2$ of Fig. 3, apply for unit field strength, then when the field strength is two units the curves $S_1$, $S_2$ and $S_2 \cos \phi$ will all have doubled in amplitude. It follows that the quotient of $S_2 \cos \phi$ divided by $S_1$ will be the same under both, and in fact under all conditions of field strength. The curve $$\frac{S_2 \cos \phi}{S_1}$$

is therefore the desired curve for the purpose of measuring small departures from the equi-signal plane.

The values of $S_1$ and $S_2$ depend directly on the conversion efficiencies of the crystal mixers 10 and 11 of Fig. 1. If, for instance, the conversion efficiency of mixer 11 is greater than that of mixer 10, then the expression $$\frac{S_2 \cos \phi}{S_1}$$

will be greater than it would be if the two conversion efficiencies were equal, and the direction of the incident radiation would be indicated as a greater angle from the equi-signal direction than was actually the case.

It has been explained that in the simple system of Fig. 1 the crystal mixers must be operated from sources which are mismatched owing to mutual coupling between the aerials giving rise to undesired phase shifts. A further effect of the mismatch is to cause variations in the conversion efficiency of the crystal mixers. By the present invention the mismatch caused by mutual coupling is reduced or eliminated; it follows that the variations in conversion efficiency of the crystal mixers will similarly be reduced, thereby improving the operation of the static split aerial system as a device for indicating the departure of the angle of incident radiation from the equi-signal direction.

What I claim as my invention and desire to secure by Letters Patent is:

1. A static split aerial system, having at least two individual directional aerials arranged in known relationship with each other so as to define one or more equi-signal planes, wherein is included coupling means itself providing between any two of the said aerials that together define one said equi-signal plane mutual coupling of substantially equal magnitude but of opposite effect to the mutual coupling existing between the said two aerials in the absence of the said coupling means, so that the resultant mutual coupling between the said two aerials is minimised.

2. A static split aerial system comprising at least two individual aerials arranged in known relationship with each other so that their polar diagrams define one or more equi-signal planes, at least some of the said aerials having by reason of their proximity mutual coupling between them, a transmission line connecting each said aerial to associated equipment, and coupling means arranged to provide between the two transmission lines associated with any two of the said aerials that together define one said equi-signal plane mutual coupling of substantially equal magnitude but of opposite effect to the mutual coupling existing between the said two aerials in the absence of the said coupling means, so that the resultant mutual coupling between the said two aerials is minimised.

3. A static split aerial system according to claim 2, wherein the said coupling means is situated at or near the ends of the said transmission lines that are connected to the said aerials.

4. A static split aerial system according to claim 3, wherein the said transmission lines are waveguides and the said coupling means comprises a branch waveguide between two said waveguides.

5. A static split aerial system according to claim 4, wherein the said branch waveguide is formed by a slot in a coupling member, opposed faces of which lie each in a recess cut in a wall of one of the said waveguides so that each said face continues without discontinuity the internal surface of the wall.

6. A static split aerial system according to claim 3, wherein the said two transmission lines are waveguides having one common wall and the said coupling means comprises at least one aperture in the said common wall.

7. A static split aerial system comprising at least two individual aerials arranged in known relationship with each other so that their polar diagrams define one or more equisignal planes, transmissions means connecting each said aerial to equpiment for determining the direction of received energy in terms of the said equi-signal planes, and means for minimising the mutual coupling between the said aerials in order to minimise errors in the said determination.

References Cited in the file of this patent

UNITED STATES PATENTS

| | | |
|---|---|---|
| 2,523,398 | Southworth | Sept. 26, 1950 |
| 2,573,746 | Watson | Nov. 6, 1951 |
| 2,677,055 | Allen | Apr. 27, 1954 |